US012744971B2

(12) United States Patent
Seo et al.

(10) Patent No.: US 12,744,971 B2
(45) Date of Patent: Sep. 22, 2026

(54) DISPLAY DEVICE

(71) Applicant: LG ELECTRONICS INC., Seoul (KR)

(72) Inventors: Gwanhui Seo, Seoul (KR); Sanghyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/852,346

(22) PCT Filed: Mar. 29, 2022

(86) PCT No.: PCT/KR2022/004383
§ 371 (c)(1),
(2) Date: Sep. 27, 2024

(87) PCT Pub. No.: WO2023/191122
PCT Pub. Date: Oct. 5, 2023

(65) Prior Publication Data
US 2025/0220279 A1 Jul. 3, 2025

(51) Int. Cl.
*H04N 21/488* (2011.01)
*H04N 21/41* (2011.01)
*H04N 21/436* (2011.01)
*H04N 21/442* (2011.01)
*H04N 21/478* (2011.01)

(52) U.S. Cl.
CPC ..... *H04N 21/4882* (2013.01); *H04N 21/4108* (2013.01); *H04N 21/43615* (2013.01); *H04N 21/44231* (2013.01); *H04N 21/4781* (2013.01)

(58) Field of Classification Search
CPC ......... H04N 21/4882; H04N 21/44231; H04N 21/4108; H04N 21/4781; H04N 21/43615
See application file for complete search history.

(56) References Cited

U.S. PATENT DOCUMENTS 9,958,934 B1 * 5/2018 Mullen .................. G06F 1/163
11,504,629 B2 * 11/2022 Hino .................... A63F 13/235
(Continued)

FOREIGN PATENT DOCUMENTS

KR 10-2005-0057719 A 6/2005
KR 10-0650664 B1 11/2006
(Continued)

OTHER PUBLICATIONS

International Search Report (PCT/ISA/210) of PCT/KR2022/004383, dated Dec. 21, 2022.

*Primary Examiner* — John W Miller
(74) *Attorney, Agent, or Firm* — Birch, Stewart, Kolasch & Birch, LLP

(57) ABSTRACT

A display device according to an embodiment of the present disclosure may include a memory; a display; a wireless communication interface for performing wireless communication with a plurality of game manipulation devices having the same brand name or model name; and a controller for receiving battery information indicating a low battery level from one of the game manipulation devices in a state where the plurality of game manipulation devices are connected to the display device, and displaying a battery low notification including the device name on the display when the device name of the game manipulation device is stored in the memory.

6 Claims, 11 Drawing Sheets

(56) References Cited

U.S. PATENT DOCUMENTS

| | | | | |
|---|---|---|---|---|
| 2005/0170889 | A1* | 8/2005 | Lum | H04W 84/22 463/39 |
| 2015/0115971 | A1 | 4/2015 | Kim et al. | |
| 2016/0292989 | A1* | 10/2016 | Belk | H04N 21/41265 |
| 2020/0238167 | A1 | 7/2020 | Downs et al. | |
| 2023/0350478 | A1* | 11/2023 | Lee | G08C 17/02 |

FOREIGN PATENT DOCUMENTS

| | | | | |
|---|---|---|---|---|
| KR | 10-2008-0028615 | A | 4/2008 | |
| KR | 10-2010-0057415 | A | 5/2010 | |
| KR | 10-1085610 | B1 | 11/2011 | |
| KR | 10-2019-0060367 | A | 6/2019 | |
| KR | 10-2019-0067738 | A | 6/2019 | |
| KR | 10-2105170 | B1 | 4/2020 | |
| WO | WO-2005028057 | A1 * | 3/2005 | A63F 13/12 |
| WO | WO-2014107789 | A1 * | 7/2014 | G07F 17/3218 |

* cited by examiner 180
205
200
(a)
(b)
(c)

180
100
800
Eng
$%^
Aa
1 2 3 4 5 6 7 8 9 0
Q W E R T Y U I O P
A S D F G H J K L ;
@ Z X C V B N M , .
Done
Clear All
501a
503a
505a
501
503
505

AA:BB:CC - John
DD:EE:FF - Sam
GG:HH:KK - Peter

FIG. 11

180
500
100
1100
PLEASE CHARGE BATTERY
OF DEVICE WHOSE LED IS BLINKING.
117
501a
503a
505a
501
503
505

DISPLAY DEVICE

CROSS REFERENCE TO RELATED APPLICATIONS

This application is the National Phase of PCT International Application No. PCT/KR2022/004383, filed on Mar. 29, 2022, which is hereby expressly incorporated by reference into the present application.

TECHNICAL FIELD

The present disclosure relates to a display device, and to a display device for transmitting low battery information of an external device connected to the display device.

BACKGROUND ART

Digital TV services using wired or wireless communication networks are becoming widespread. Digital TV services may provide a variety of services that were not available with existing analog broadcasting services.

For example, Internet Protocol Television (IPTV) and smart TV services, which are types of digital TV service, provide interactivity that allows users to actively select the type of program to watch, the viewing time, or the like. Based on this interactivity, the IPTV and smart TV services may also provide various additional services, such as Internet search, home shopping, and online games.

Recently, there has been an increase in scenes where a plurality of Human Interface Devices (HID) are connected directly to TVs without connecting game consoles for game play through cloud servers.

In particular, for multiplayer games for two or more players, game manipulation devices of the same brand and product are connected to the TV.

However, in a case where a plurality of game manipulation devices are connected to a TV, there is a problem in that when the battery is low, no low or replacement notification is output, and even if the battery notification is responded thereto, it is difficult for the user to recognize which of the plurality of game manipulation devices has low battery.

In addition, even if the game manipulation device itself outputs a low battery status, it is difficult for the user to recognize that the game manipulation device is low because the user is staring at the screen while holding the game manipulation device in his/her hand.

DISCLOSURE

Technical Problem

An object of the present disclosure is to provide a display device which is capable of notifying the user of a low battery or replacement status of a game manipulation device through a screen when a plurality of game manipulation devices are connected to the display device.

An object of the present disclosure is to provide a display device which is to easily recognize the low battery status of a game manipulation device when a plurality of game manipulation devices of the same type are connected to the display device.

Technical Solution

A display device according to an embodiment of the present disclosure may include a memory; a display; a wireless communication interface for performing wireless communication with a plurality of game manipulation devices having the same brand name or model name; and a controller for receiving battery information indicating a low battery level from one of the game manipulation devices in a state where the plurality of game manipulation devices are connected to the display device, and displaying a battery low notification including the device name on the display when the device name of the game manipulation device is stored in the memory.

According to an embodiment of the present disclosure, a method for operating a display device may include receiving battery information indicating a low battery level from one of a plurality of game manipulation devices having the same brand name or model name in a state where the plurality of game manipulation devices are connected to the display device; and displaying a low battery notification including the device name of the game manipulation device if the device name is stored in the memory.

Advantageous Effect

According to an embodiment of the present disclosure, even when a plurality of a plurality of game manipulation devices of the same brand or model are connected, a user may easily recognize which game manipulation device's battery is low based on a low battery notification during a game.

According to an embodiment of the present disclosure, even when a plurality of game manipulation devices of the same brand or model are connected, the user may intuitively recognize which game manipulation device's battery is low based on a low battery notification that includes a device name edited by the user during the game.

DESCRIPTION OF DRAWINGS

FIG. 5 illustrates an example of performing a cloud game by connecting a plurality of game manipulation devices to a display device.

FIGS. 7 to 9 are views for explaining a method for distinguishing game manipulation devices when the same type of game manipulation devices are connected to a display device according to an embodiment of the present disclosure.

FIG. 11 is a view for explaining an example of displaying a low battery notification including the brand name of the game manipulation device when a low battery state occurs in one of a plurality of game manipulation devices according to one embodiment of the present disclosure.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure is an intelligent display device that adds a computer-assisted function to, for example, a broadcast reception function, and while remaining faithful to the broadcast reception function, adds an Internet function or the like and may have a more convenient interface such as a manual input device, a touch screen, or a space remote control. In addition, with the support of wired or wireless Internet functions, it is possible to connect to the Internet and a computer, and perform functions such as email, web browsing, banking, or games. A standardized general-purpose OS may be used for these various functions.

Accordingly, the display device described in the present disclosure may perform various user-friendly functions, for example, since various applications may be freely added or deleted on a general-purpose OS kernel. More specifically, the display device may be, for example, a network TV, an HBBTV, a smart TV, an LED TV, an OLED TV, or the like and in some cases, may also be applied to a smartphone.

Figure 1:
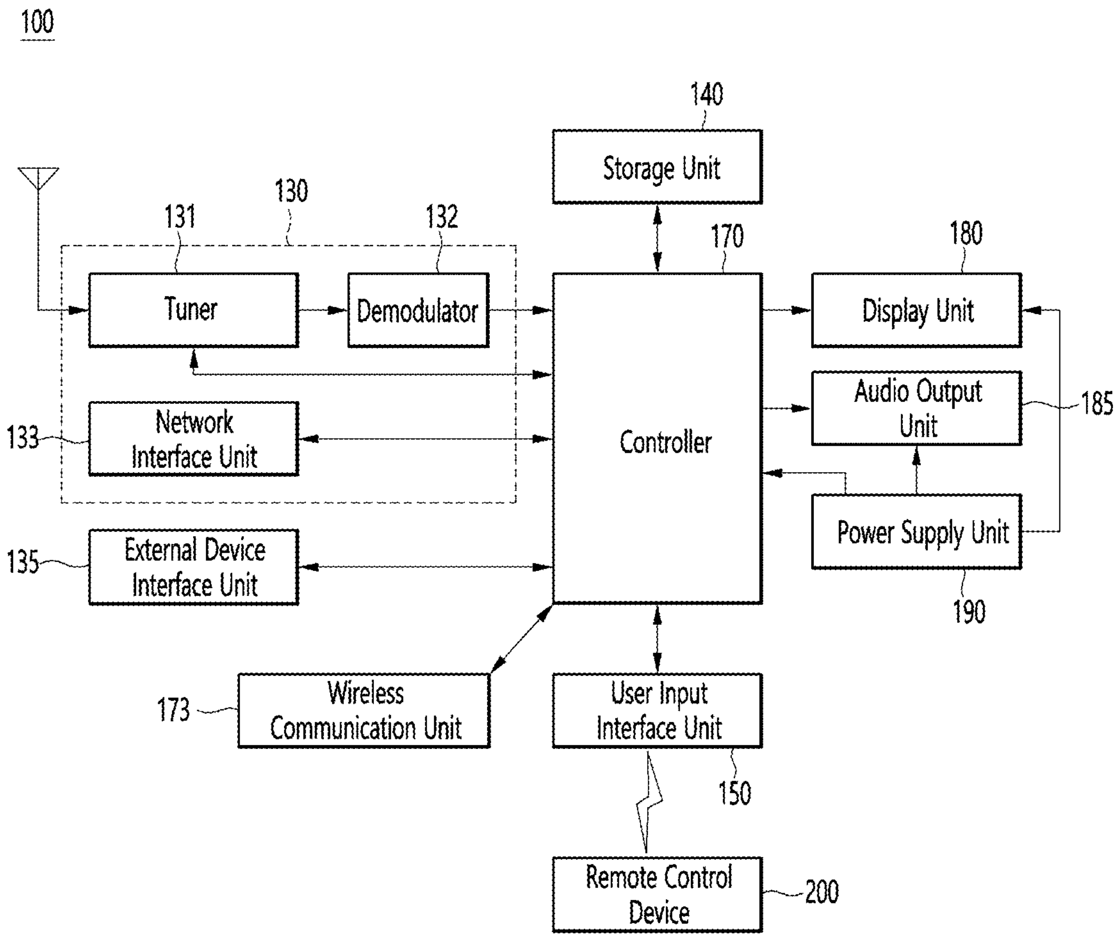
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception part 130, an external device interface 135, a memory 140, a user input interface 150, a controller 170, a wireless communication interface 173, a display 180, a speaker 185, and a power supply circuit 190.

The broadcast reception part 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into image signals, audio signals, and broadcast program-related data signals, and may restore the divided image signals, audio signals, and data signals into an output available form.

The external device interface 135 may receive an application or an application list in an adjacent external device and deliver the application or the application list to the controller 170 or the memory 140.

The external device interface 135 may provide a connection path between the display device 100 and an external device. The external device interface 135 may receive at least one of an image or audio outputted from an external device that is wirelessly or wiredly connected to the display device 100 and deliver the received image or the audio to the controller. The external device interface 135 may include a plurality of external input terminals. The plurality of external input terminals may include an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the speaker 185.

An external device connectable to the external device interface 135 may be one of a set-top box, a Blu-ray player, a DVD player, a game console, a sound bar, a smartphone, a PC, a USB Memory, and a home theater system but this is just exemplary.

The network interface 133 may provide an interface for connecting the display device 100 to a wired/wireless network comprising internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface 133 may access a predetermined webpage through an accessed network or another network linked to the accessed network. In other words, the network interface 133 may transmit or receive data to or from a corresponding server by accessing a predetermined webpage through the network.

The network interface 133 may receive content or data provided from a content provider or a network operator. In other words, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through network.

The memory 140 may store signal-processed image, voice, or data signals stored by a program in order for each signal processing and control in the controller 170.

In addition, the memory 140 may perform a function for temporarily storing image, voice, or data signals output from the external device interface 135 or the network interface 133, and may store information on a predetermined image through a channel memory function.

The memory 140 may store an application or an application list input from the external device interface 135 or the network interface 133.

The display device 100 may play content files (e.g., video files, still image files, music files, document files, application files, etc.) stored in the memory 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not illustrated) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the speaker 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the speaker 185.

In addition, the controller 170 may output image signals or voice signals of an external device such as a camera or a camcorder, which are input through the external device interface 135, through the display 180 or the speaker 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the memory 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication interface 173 may perform wired or wireless communication with an external device. The wireless communication interface 173 may perform short-range communication with an external device. For this, the wireless communication interface 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a wearable device capable of communication around the display device 100.

Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 illustrated in FIG. 1 is just one embodiment of the present disclosure and thus, some of the components illustrated may be integrated, added, or omitted according to the specification of the actually implemented display device 100.

In other words, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display 180 and the speaker 185.

A remote control device according to an embodiment of the present disclosure will be described with reference to FIGS. 2 and 3.

Figure 2:
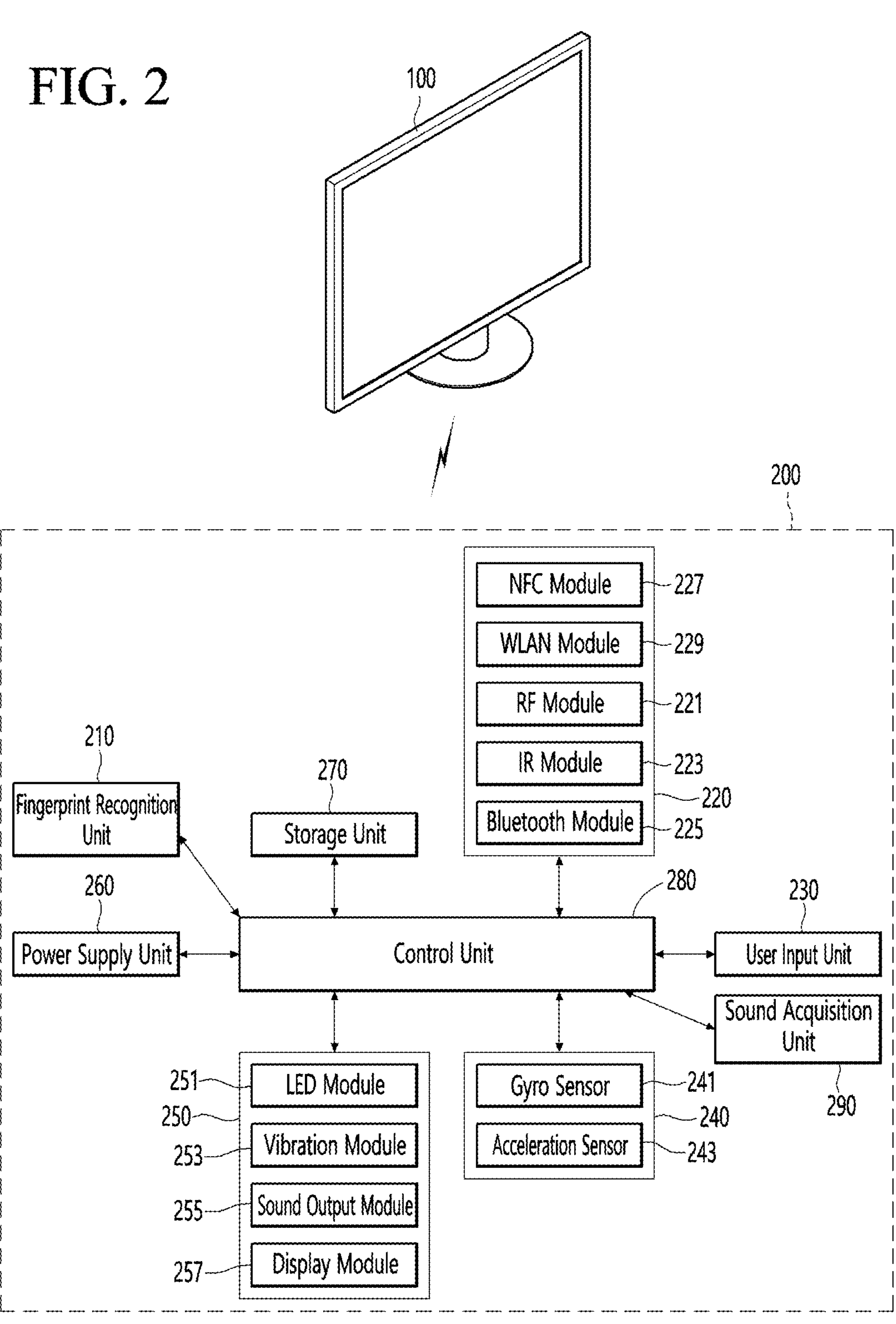
FIG. 2 is a block diagram illustrating a remote control device according to an embodiment of the present disclosure
Figure 3:
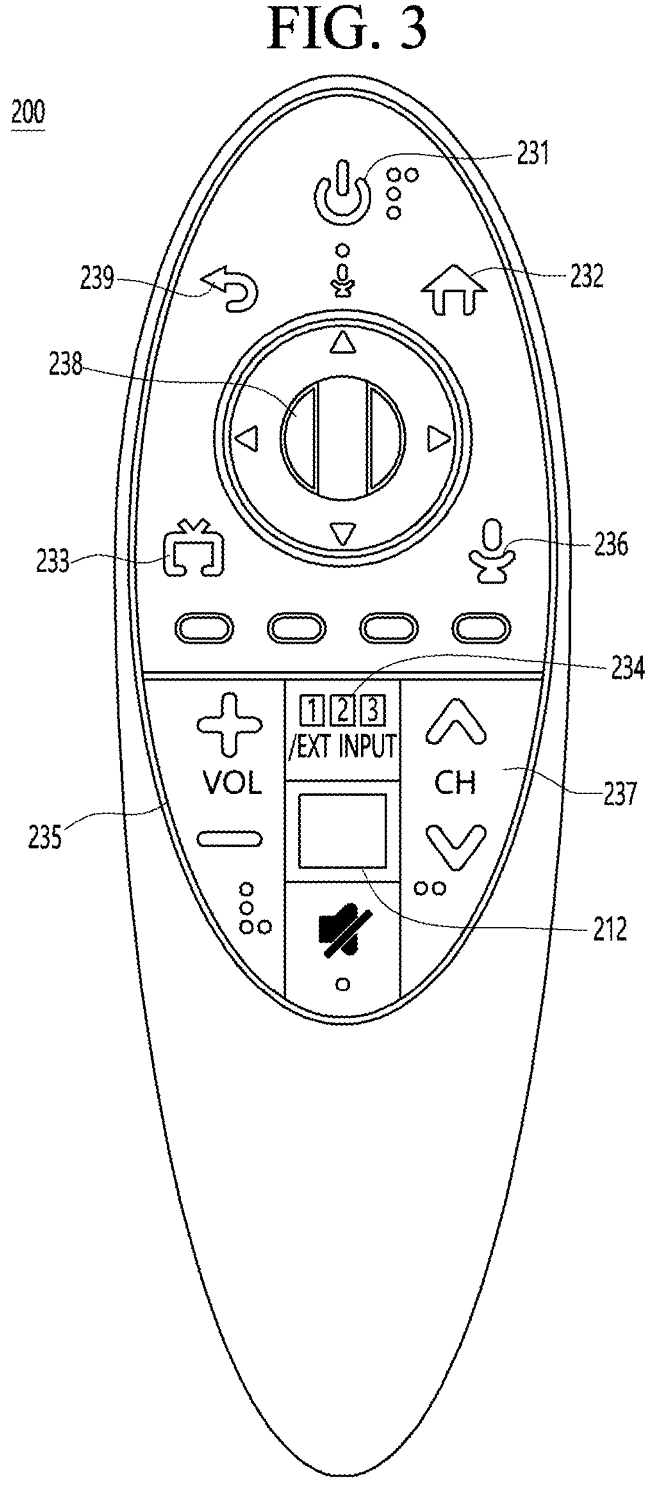
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition device 210, a wireless communication interface 220, a user input interface 230, a sensor 240, an output interface 250, a power supply circuit 260, a memory 270, a controller 280, and a microphone 290.

Referring to FIG. 2, the wireless communication interface 220 transmits/receives signals to/from an arbitrary any one of display devices according to the above-mentioned embodiments of the present disclosure.

The remote control device 200 may include a radio frequency (RF) circuit 221 capable of transmitting or receiving signals to or from the display device 100 according to an RF communication standard, and an IR circuit 223 capable of transmitting or receiving signals to or from the display device 100 according to an IR communication standard. In addition, the remote control device 200 may include a Bluetooth circuit 225 capable of transmitting or receiving signals to or from the display device 100 according to a Bluetooth communication standard. In addition, the remote control device 200 may include an NFC circuit 227 capable of transmitting or receiving signals to or from the display device 100 according to an NFC communication standard, and a wireless LAN (WLAN) circuit 229 capable of transmitting or receiving signals to or from the display device 100 according to a WLAN communication standard.

In addition, the remote control device 200 may transmit signals containing information on the movement of the remote control device 200 to the display device 100 through the wireless communication interface 220.

Moreover, the remote control device 200 may receive signals transmitted from the display device 100 through the RF circuit 221 and if necessary, may transmit a command for power on/off, channel change, and volume change to the display device 100 through the IR circuit 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation.

The power button 231 may be a button for turning on/off the power of the display device 100.

The home button 232 may be a button for moving to the home screen of the display device 100.

The live button 233 may be a button for displaying live broadcast programs.

The external input button 234 may be a button for receiving an external input connected to the display device 100.

The volume control button 235 may be a button for controlling a volume output from the display device 100.

The voice recognition button 236 may be a button for receiving user's voice and recognizing the received voice.

The channel change button 237 may be a button for receiving broadcast signals of a specific broadcast channel.

The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 230, or may output image or voice signals corresponding to signals transmitted from the display device 100.

A user may recognize whether the user input interface 230 is operated or the display device 100 is controlled through the output interface 250.

For example, the output interface 250 may include an LED 251 for flashing, a vibrator 253 for generating vibration, a speaker 255 for outputting sound, or a display 257 for outputting an image, if the user input interface 230 is manipulated or signals are transmitted/received to/from the display device 100 through the wireless communication interface 220.

Additionally, the power supply circuit 260 supplies power to the remote control device 200 and if the remote control device 200 does not move for a predetermined time, stops the power supply, so that power waste may be reduced.

The power supply circuit 260 may resume the supply of power if a predetermined key provided at the remote control device 200 is operated.

The memory 270 may store various kinds of programs and application data required to control or operate the remote control device 200.

If the remote control device 200 transmits/receives signals wirelessly through the display device 100 and the RF circuit 221, the remote control device 200 and the display device 100 transmits/receives signals through a predetermined frequency band.

The controller 280 of the remote control device 200 may store, in the memory 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 230 or a signal corresponding to the movement of the remote control device 200 sensed by the sensor 240 to the display device 100 through the wireless communication interface 220.

In addition, the microphone 290 of the remote control device 200 may acquire voice.

A plurality of microphones 290 may be provided.

Figure 4:
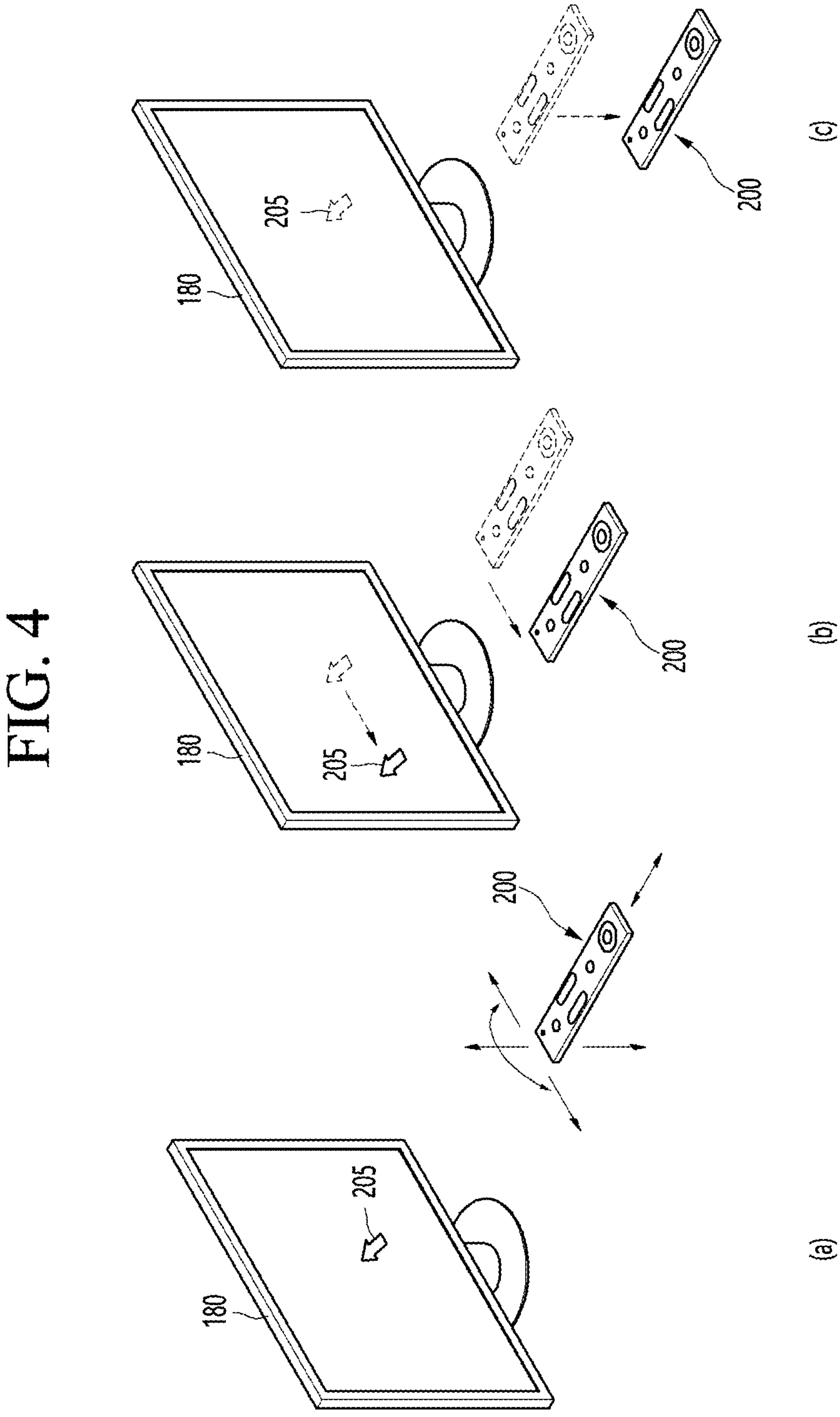
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. In other words, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
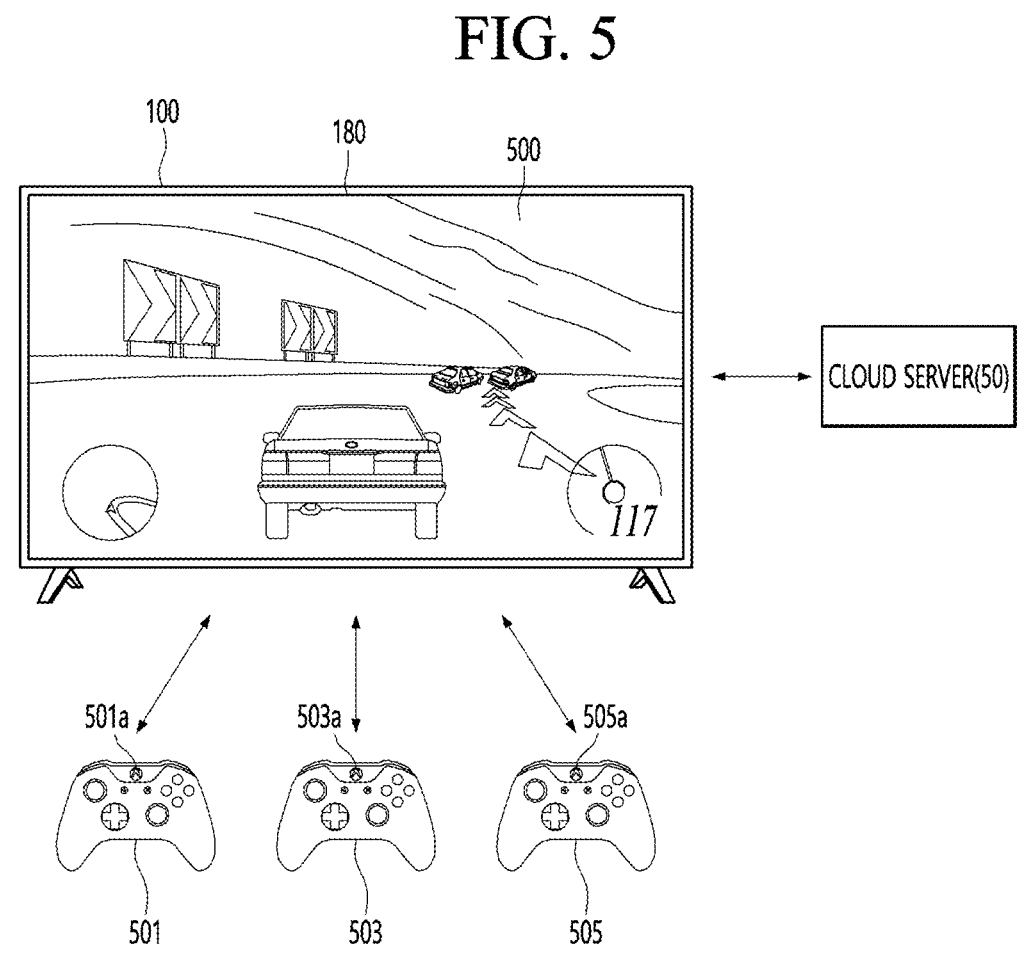

FIG. 5 illustrates an example of performing a cloud game by connecting a plurality of game manipulation devices to a display device.

In other words, FIG. 5 illustrates an example of performing a cloud game through a plurality of game manipulation devices 501, 503, and 505 without connecting a separate game console to the display device 100.

Referring to FIG. 5, the display device 100 may receive an image signal corresponding to a game image from a cloud server 50 and display a game image 500 on the display 180 based on the received image signal.

The network interface 133 of the display device 100 may communicate with the cloud server 50 through IP communication.

Additionally, a plurality of game manipulation devices 501, 503, and 505 are connected to each other through wired or wireless communication in the display device 100.

When connected through wireless communication, the communication standard used may be the Bluetooth communication standard, but this is only an example.

When connected through wired communication, the communication standard used may be Universal Serial Bus (USB), but this is only an example.

The plurality of game manipulation devices 501, 503, and 505 may be of the same brand or manufactured by the same manufacturer.

FIG. 5 illustrates an example in which three game manipulation devices 501, 503, and 505 are connected to a display device 100 through Bluetooth and a game is played, but two or four or more game manipulation devices may be connected and the game may be played.

The game manipulation device transmits a manipulation command to the display device 100, the display device 100 transmits the received manipulation command to the cloud server 50, and the cloud server 50 may transmit a response signal corresponding to the server (50) command to the display device 100.

Each of the plurality of game manipulation devices 501, 503, and 505 may include each of a plurality of LEDs 501*a*, 503*a*, 505*a*.

Each LED may be a notification light to indicate a change in status of the game manipulation device.

In particular, the LED may blink or output a specific color when the battery is low or disconnected from the display device 100.

Figure 6:
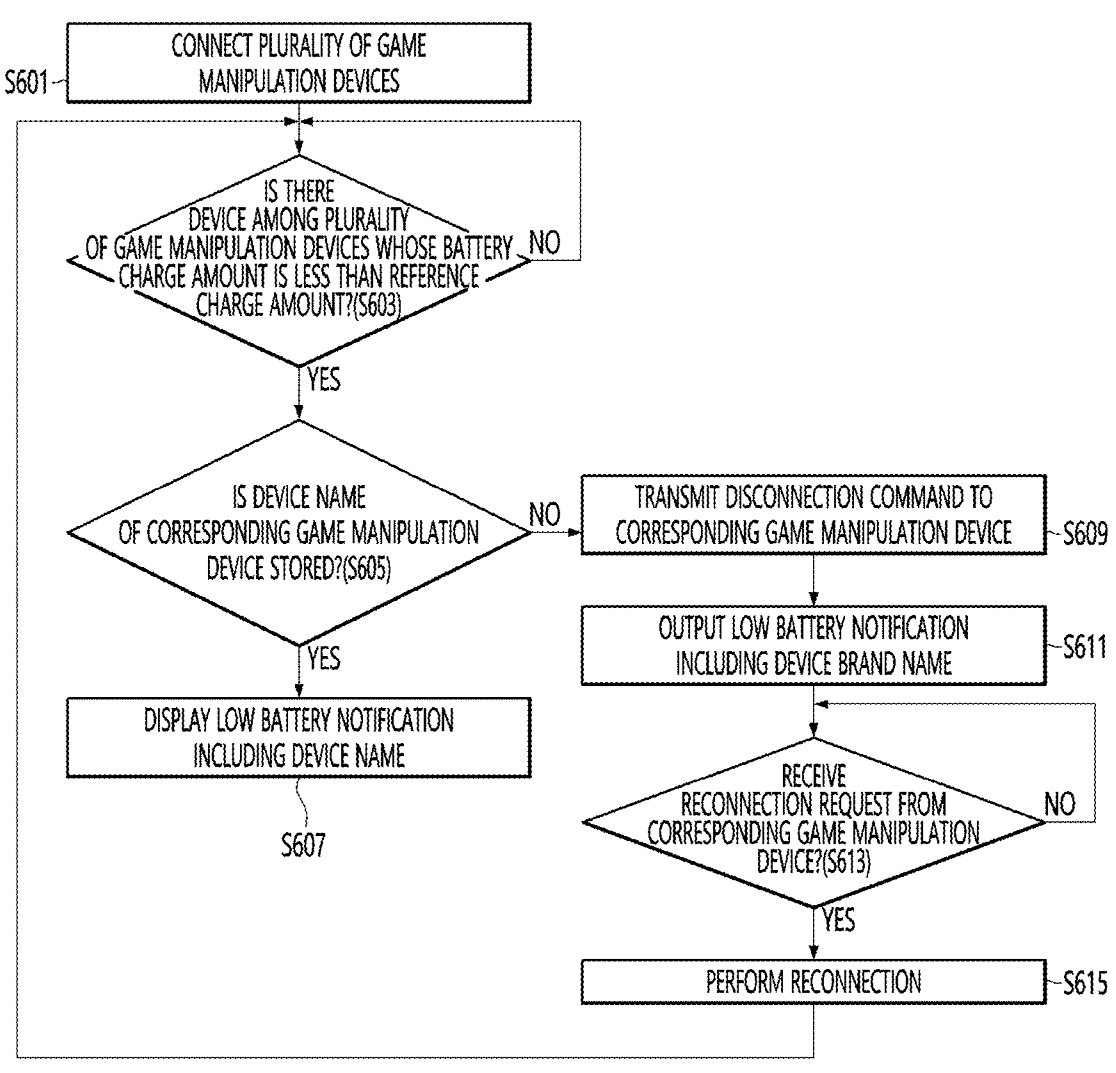
FIG. 6 is a flowchart for explaining a method for operating a display device according to an embodiment of the present disclosure.

FIG. 6 is a flowchart for explaining a method for operating a display device according to an embodiment of the present disclosure.

Below, the embodiment of FIG. 6 is described based on the embodiment of FIG. 5.

Referring to FIG. 6, a plurality of game manipulation devices are connected to the display device 100 (S601).

In one embodiment, the plurality of game manipulation devices may be devices of the same manufacturer or of the same brand.

A plurality of game manipulation devices may be connected to the display device 100 through Bluetooth communication. To this end, each of the plurality of game manipulation devices and the display device 100 may be equipped with a Bluetooth communication circuit.

The wireless communication interface 173 of the display device 100 may include a Bluetooth communication circuit.

Meanwhile, as illustrated in FIG. 5, the display device 100 is connected to a cloud server 50 through a network and plays game images 500 received from the cloud server 50 on the display 180.

When establishing a Bluetooth connection with a plurality of game manipulation devices, the display device 100 may obtain the Bluetooth address of each game manipulation device. The Bluetooth address may be information for identifying the game manipulation device.

The display device 100 may store the Bluetooth address of each game manipulation device and identify each game manipulation device through the Bluetooth address.

The controller 170 of the display device 100 determines whether there is a device among the plurality of game manipulation devices whose battery charge amount is less than the reference charge amount (S603).

The game manipulation device may transmit battery information indicating a low battery condition to the display device 100 when the battery charge amount is less than the reference charge amount.

The controller 170 may detect the presence of a game manipulation device with a battery charge amount less than the reference charge amount through the received battery information and the Bluetooth address of the device that transmitted the battery information.

In one embodiment, the reference charge amount may be a charge amount equivalent to 30%, but this is only an example.

The controller 170 of the display device 100 determines whether the device name of a game manipulation device having a battery charge amount less than the reference charge amount is stored in the memory 140 (S605).

In one embodiment, the controller 170 may determine whether the device name of the game manipulation device that has experienced a battery shortage is stored in the memory 140.

The memory 140 may match and then store the device name of the game manipulation device and the identification information of the game manipulation device.

The device name of the game manipulation device may be an edited name based on user input.

The identification information of the game manipulation device may be either the Bluetooth address or the brand name or manufacturer name of the game manipulation device.

Figure 7:
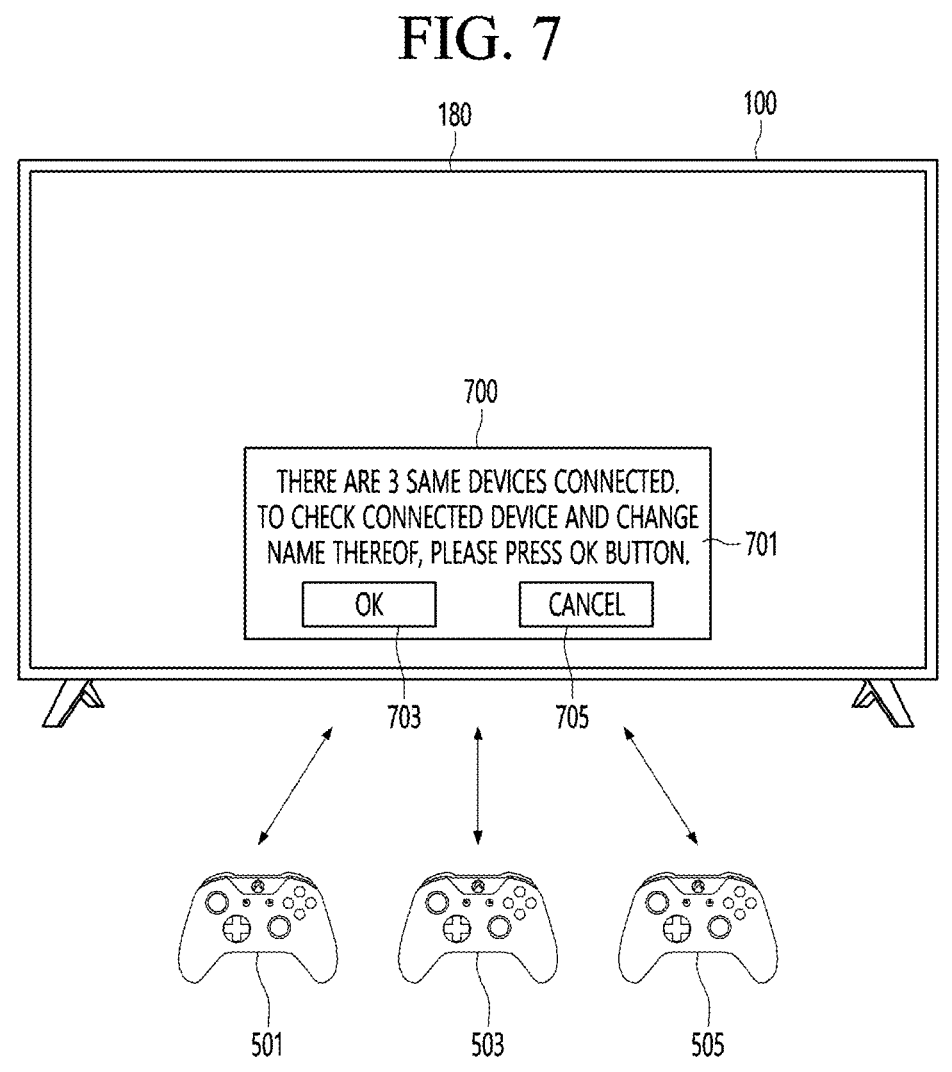
Figure 8:
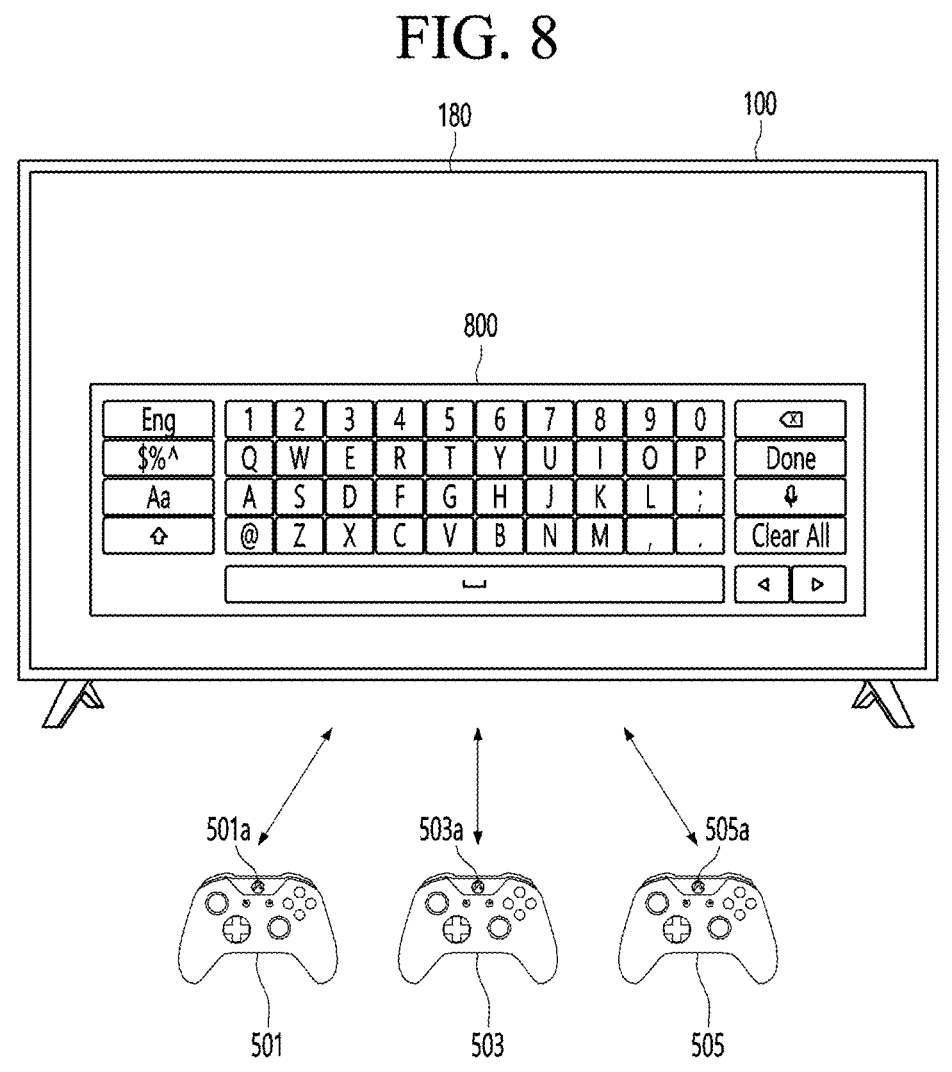
Figure 9:
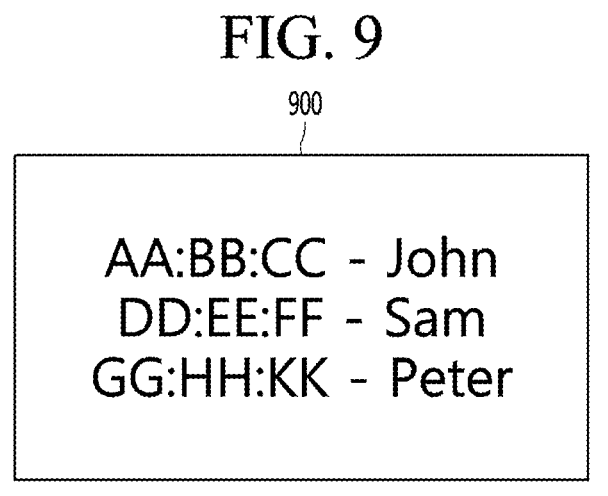

FIGS. 7 to 9 are views for explaining a method for distinguishing game manipulation devices when the same type of game manipulation devices are connected to a display device according to an embodiment of the present disclosure.

Referring to FIG. 7, the controller 170 of the display device 100 may display a pop-up window 700 for inputting a device name on the display 180 when a plurality of game manipulation devices 501, 503, and 505 of the same brand, same model, or same type are connected to the display device 100.

A pop-up window 700 may include text 701 informing that a plurality of game manipulation devices (501, 503, and 505) of the same brand or model are connected to the display device 100 and that editing of the device name is possible, an OK button 703, and a cancel button 705.

The controller 170 may display a pop-up window 700 when a plurality of game manipulation devices of the same brand or model are connected.

When a command to select the OK button 703 of the pop-up window 700 is received, the controller 170 may display a virtual keyboard window 800 for entering the device name of the game manipulation device on the display 180, as illustrated in FIG. 8.

The controller 170 may receive a command to select the OK button 703 from a remote control device 200.

The controller 170 may receive the device name of each game manipulation device through the virtual keyboard window 800.

The controller 170 may sequentially disconnect from each of the plurality of game manipulation devices 501, 503, and 505.

For example, the controller 170 may disconnect from the first game manipulation device 501. The first game manipulation device 501 may blink the first LED 501*a* as the connection with the first game manipulation device 501 is disconnected.

The controller 170 may display a message on the display 180 requesting the input of the device name of the game manipulation device whose LED is blinking.

The controller 170 may obtain the first device name of the first game manipulation device 501 through the virtual keyboard window 800, match and then store the first device name with the identification information of the first game manipulation device 501 in the memory 140.

The controller 170 may obtain the first device name by receiving an input for selecting a specific key of the virtual keyboard window 800 from the remote control device 200.

The identification information of the first game manipulation device 501 may be the first Bluetooth address.

The user may reconnect the first game manipulation device 501 and the display device 100 by entering the device name of the first game manipulation device 501 and then selecting any button of the first game manipulation device 501.

In the same manner, the second game manipulation device 503 and the third game manipulation device 505 may be sequentially disconnected, and the second device name and the third device name may be obtained.

The memory 140 may match and then store the second device name to the identification information of the second game manipulation device 503, and may match and then store the third device name to the identification information of the third game manipulation device 505.

Referring to FIG. 9, a table 900 is illustrated in which a plurality of device names are matched and then stored for each of a plurality of game manipulation devices 501, 503, and 505.

For example, AA:BB:CC, which is the identification information of the first game manipulation device 501, matches the first device name (John), DD:EE:FF, which is the identification information of the second game manipulation device 503, matches the second device name (Sam), and GG:HH:KK, which is the identification information of the third game manipulation device 505, matches the third device name (Peter).

Each device name may be used later to notify users of which device has experienced a low battery condition.

Again, FIG. 6 is explained.

If the device name of a game manipulation device whose battery charge amount is less than the reference charge amount is stored in the memory 140, the controller 170 of the display device 100 outputs a low battery notification including the device name on the display 180 (S607).

The controller 170 may determine whether there is a device name that matches the identification information of a game manipulation device that transmitted a low battery status among a plurality of game manipulation devices.

For example, when the controller 170 receives battery information indicating a low battery state from the third game manipulation device 505, the controller may determine whether there is a device name matching GG:HH:KK, which is the identification information of the third game manipulation device 505, from the memory 140.

The controller 170 may read out the third device name (Peter) matching GG:HH:KK, which is the identification information of the third game manipulation device 505, from the memory 140.

The controller 170 may display a notification on the display 180 indicating a low battery status of the game manipulation device matching the third device name (Peter) which is read out.

Figure 10:
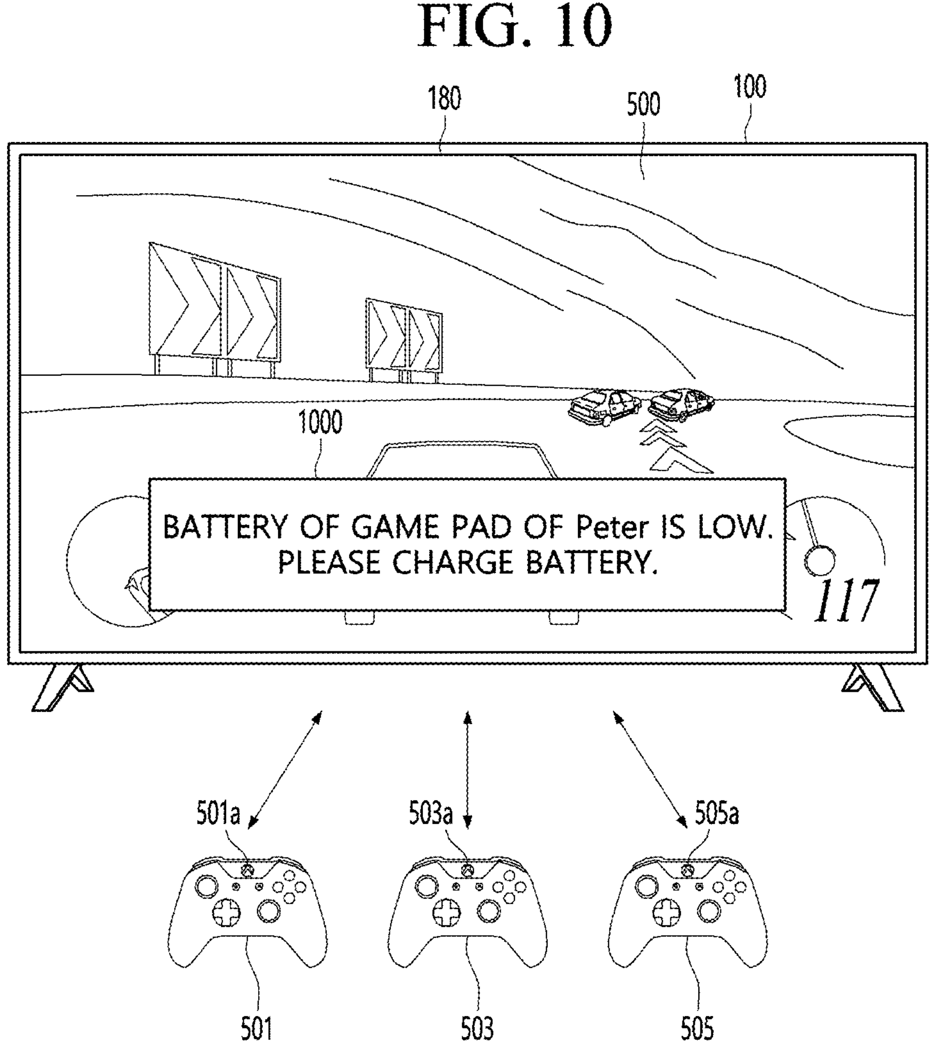
FIG. 10 is a view for explaining an example of displaying a low battery notification including the name of a game manipulation device when a low battery state occurs in one of a plurality of game manipulation devices according to one embodiment of the present disclosure.

FIG. 10 is a view for explaining an example of displaying a low battery notification including the name of a game manipulation device when a low battery state occurs in one of a plurality of game manipulation devices according to one embodiment of the present disclosure.

Referring to FIG. 10, a display device 100 is playing a game image (500) in a state of being connected to a plurality of game manipulation devices (501, 503, and 505).

The display device 100 may receive battery information indicating a low battery status from the third game manipulation device 505 through Bluetooth.

In other words, when the battery charge amount is less than the reference charge amount, the third game manipulation device 505 may transmit battery information indicating a low battery state to the display device 100.

The third game manipulation device 505 may transmit battery information indicating a low battery state to the display device 100 only when the battery charge amount is less than the reference charge amount, and may not transmit battery information to the display device 100 when the battery charge amount is equal to or more than the reference charge amount.

The display device 100 may determine the battery low status of the third game manipulation device 505 based on battery information received from the third game manipulation device 505.

The display device 100 may recognize that it has received battery information from the third game manipulation device 505 through a Bluetooth address which already knows through Bluetooth communication with the third game manipulation device 505.

The display device 100 may obtain the third device name (Peter) matching the Bluetooth address (GG:HH:KK), which is the identification information of the third game manipulation device 505, from the memory 140.

The display device 100 may display a low battery notification 1000 including the obtained third device name (Peter) on the display 180.

In this way, according to an embodiment of the present disclosure, even when a plurality of game manipulation devices of the same brand or model are connected, the user may easily recognize which game manipulation device's battery is low based on a low battery notification (1000) during the game.

Again, FIG. 6 is explained.

The controller 170 of the display device 100 transmits a disconnection command to the game manipulation device if the device name of the game manipulation device whose battery charge amount is less than the reference charge amount is not stored in the memory 140 (S609).

The Controller 170

The controller 170 may transmit a Bluetooth disconnection command to the game manipulation device to notify the game manipulation device of a low battery condition in which the battery charge amount is less than the reference charge amount.

The game manipulation device may blink the LED thereof in response to a disconnect command.

The controller 170 of the display device 100 displays a low battery notification including the brand name (or manufacturer name) of the game manipulation device whose battery charge amount is less than the reference charge amount on the display 180 (S611).

The controller 170 may recognize which game manipulation device is in a low battery state, but since the device name of the device is not stored, the device name may not be output.

The controller 170 may transmit a disconnection command to a game manipulation device in a low battery state, causing the LED of the game manipulation device to blink.

The controller 170 may display a low battery notification including the brand name or model name of the game manipulation device on the display 180.

Figure 11:
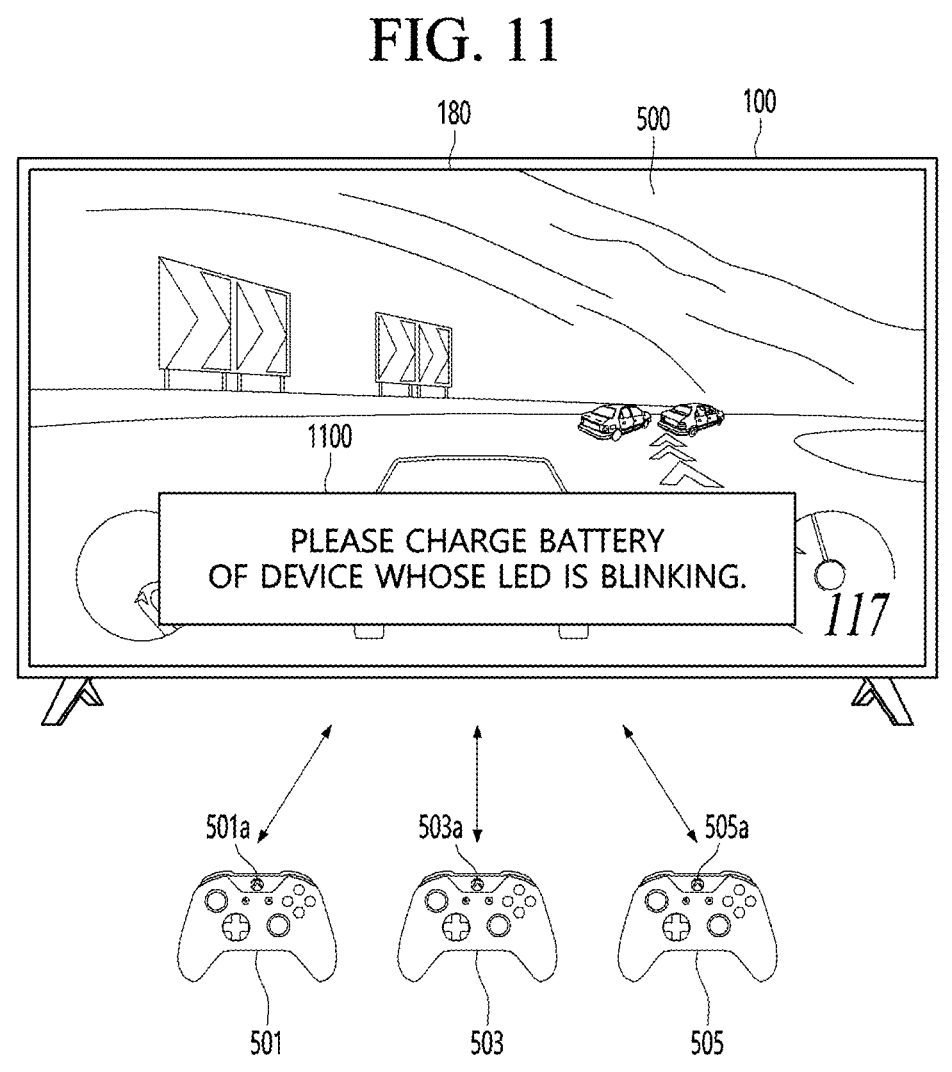

FIG. 11 is a view for explaining an example of displaying a low battery notification including the brand name of the game manipulation device when a low battery state occurs in one of a plurality of game manipulation devices according to one embodiment of the present disclosure.

Referring to FIG. 11, the display device 100 may receive battery information indicating a low battery state from a third game manipulation device 505 among a plurality of game manipulation devices 501, 503, and 505.

The display device 100 may transmit a Bluetooth disconnection command to the third game manipulation device 505 if the device name of the third game manipulation device 505 is not searched in the memory 140.

At the same time, the display device 100 may display a low battery notification 1100 including the brand name of the third game manipulation device 505 on the display 180.

Meanwhile, the third game manipulation device 505 may blink the LED **505*a*** upon receipt of a Bluetooth disconnection command.

The user may easily recognize that the battery of the third game manipulation device 505 with the blinking LED **505*a* is low by checking the low battery notification 1100**.

Again, FIG. 6 is explained.

The controller 170 of the display device 100 determines whether a reconnection request is received from the game manipulation device (S613), and if a reconnection request is received, performs a reconnection process (615).

The controller 170 may resume Bluetooth communication upon receiving a request for Bluetooth reconnection from a game manipulation device for which the device name is not stored.

The user may reconnect the display device 100 and the game manipulation device by charging or replacing the battery of the game manipulation device that is running low on battery.

The user may reconnect the display device 100 and the game manipulation device by entering any key provided on the game manipulation device.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications may be made.

The invention claimed is:

1. A display device, comprising:
- a memory;
- a display;
- a wireless communication interface for performing wireless communication with a plurality of game manipulation devices having the same brand name or model name; and
- a controller for receiving battery information indicating a low battery level from one of the game manipulation devices in a state where the plurality of game manipulation devices are connected to the display device, and displaying a battery low notification including a device name on the display when the device name of the game manipulation device is stored in the memory, wherein the controller, when the plurality of game manipulation devices having the same brand name or model name are connected to the display device, displays a pop-up window on the display and sequentially disconnects each of the plurality of game manipulation devices through the wireless communication interface;

obtains a device name of each game manipulation device by receiving a key selection command entered in a virtual keyboard window displayed on the display, and stores the obtained device name in the memory in association with identification information of each game manipulation device, wherein the identification information is a Bluetooth address of the game manipulation device; and displays the battery low notification including the stored device name on the display, wherein the controller obtains the device name from the memory by matching the Bluetooth address of the game manipulation device that transmitted the battery information.

2. The display device of claim 1, wherein the controller displays a low battery notification including the brand name or model name of the game manipulation device on the display when the device name of the game manipulation device is not stored in the memory.

3. The display device of claim 2, wherein the controller transmits a disconnection command for wireless disconnection to the game manipulation device through the wireless communication interface when the device name of the game manipulation device is not stored in the memory, causing an LED of the game manipulation device to blink to notify a user of the low battery level.

4. A method for operating a display device comprising:

when a plurality of game manipulation devices having the same brand name or model name are connected to the display device, displaying a pop-up window on a display of the display device and sequentially disconnecting each of the plurality of game manipulation devices through a wireless communication interface of the display device;

obtaining a device name of each game manipulation device by receiving a key selection command entered in a virtual keyboard window displayed on the display, and storing the obtained device name in a memory of the display device in association with a Bluetooth address of each game manipulation device;

receiving battery information indicating a low battery level from one of a plurality of game manipulation devices having the same brand name or model name in a state where the plurality of game manipulation devices are connected to the display device; and displaying a low battery notification including a device name of the game manipulation device if the device name is stored in a memory, wherein the displaying a low battery notification comprises obtaining the device name from the memory by matching the Bluetooth address of the game manipulation device that transmitted the battery information with a stored Bluetooth address, and displaying the battery low notification including an edited device name on the display.

5. The method for operating a display device of claim 4, further comprising:

displaying a low battery notification including the brand name or model name of the game manipulation device if the device name of the game manipulation device is not stored in the memory.

6. The method for operating a display device of claim 5, further comprising:

transmitting a disconnection command for wireless disconnection to the game manipulation device through the wireless communication interface when the device name of the game manipulation device is not stored in the memory, causing an LED of the game manipulation device to blink to notify a user of the low battery level.

* * * * *